(12) United States Patent
Pollack

(10) Patent No.: US 8,011,151 B2
(45) Date of Patent: Sep. 6, 2011

(54) MULTI-LAYER BUILDING INSULATION AND WALLBOARD SHEET WITH MULTI-LAYER INSULATION

(76) Inventor: Robert William Pollack, Chappaqua, NY (US)

( * ) Notice: Subject to any disclaimer, the term of this patent is extended or adjusted under 35 U.S.C. 154(b) by 0 days.

(21) Appl. No.: 12/723,185

(22) Filed: Mar. 12, 2010

(65) Prior Publication Data

US 2010/0233460 A1 Sep. 16, 2010

Related U.S. Application Data

(60) Provisional application No. 61/159,776, filed on Mar. 12, 2009.

(51) Int. Cl.
*E04C 1/00* (2006.01)
(52) U.S. Cl. ............... 52/309.8; 52/309.12; 52/309.15; 52/309.17
(58) Field of Classification Search ............ 52/309.1, 52/309.4–309.17; 428/452, 454
See application file for complete search history.

(56) References Cited

U.S. PATENT DOCUMENTS

| | | | |
|---|---|---|---|
| 4,394,337 A | 7/1983 | Kummermehr | |
| 4,642,949 A | 2/1987 | Hopper | |
| 5,877,100 A | 3/1999 | Smith et al. | |
| 5,996,297 A * | 12/1999 | Keith et al. | 52/410 |
| 6,136,216 A | 10/2000 | Fidler et al. | |
| 7,226,243 B2 | 6/2007 | Lee et al. | |
| 2003/0087103 A1 | 5/2003 | Belmares et al. | |
| 2004/0048049 A1 * | 3/2004 | Merrill et al. | 428/209 |
| 2004/0132846 A1 | 7/2004 | Leventis et al. | |
| 2005/0100728 A1 * | 5/2005 | Ristic-Lehmann et al. | 428/323 |
| 2006/0035054 A1 | 2/2006 | Stepanian et al. | |
| 2006/0194026 A1 | 8/2006 | Blair et al. | |
| 2006/0240216 A1 | 10/2006 | Stepanian et al. | |
| 2007/0004306 A1 | 1/2007 | Leeser et al. | |
| 2007/0208124 A1 | 9/2007 | Schiraldi et al. | |
| 2008/0132632 A1 | 6/2008 | Schiraldi et al. | |
| 2008/0286609 A1 | 11/2008 | Surace et al. | |
| 2009/0130452 A1 | 5/2009 | Surace et al. | |
| 2010/0077698 A1 | 4/2010 | Tinianov | |

FOREIGN PATENT DOCUMENTS

WO WO-2006091812 A2 8/2006

OTHER PUBLICATIONS

Press Release dated Sep. 16, 2008 from Serious Materials, Inc. of their ThermaRock energy-saving drywall (2 pages).
ThermaRock XI Energy Saving Dryway datasheet from Serious Materials, Inc.'s website; see www.seriousmaterials.com last revised on Aug. 26, 2008 (1 page).

* cited by examiner

*Primary Examiner* — William Gilbert
(74) *Attorney, Agent, or Firm* — Edwards Angell Palmer & Dodge LLP; Brian R. Pollack, Esq.

(57) ABSTRACT

A multilayer insulation material is provided. The insulation material preferably includes a plurality of substantially air-impermeable material layers joined together, with at least one space being provided between a pair of adjacent material layers thereof. At least one layer of a foam material and/or aerogel material can be interposed between a pair of adjacent material layers. At least one reflective layer can be provided for inhibiting radiative heat transfer across the insulation material. In accordance with another aspect of the disclosure, a construction panel is provided, having a structural panel portion having predetermined material properties for performing a predetermined function, and a plurality of substantially air-impermeable material layers joined to the structural panel portion, at least one space being provided between a pair of adjacent material layers thereof.

20 Claims, 1 Drawing Sheet

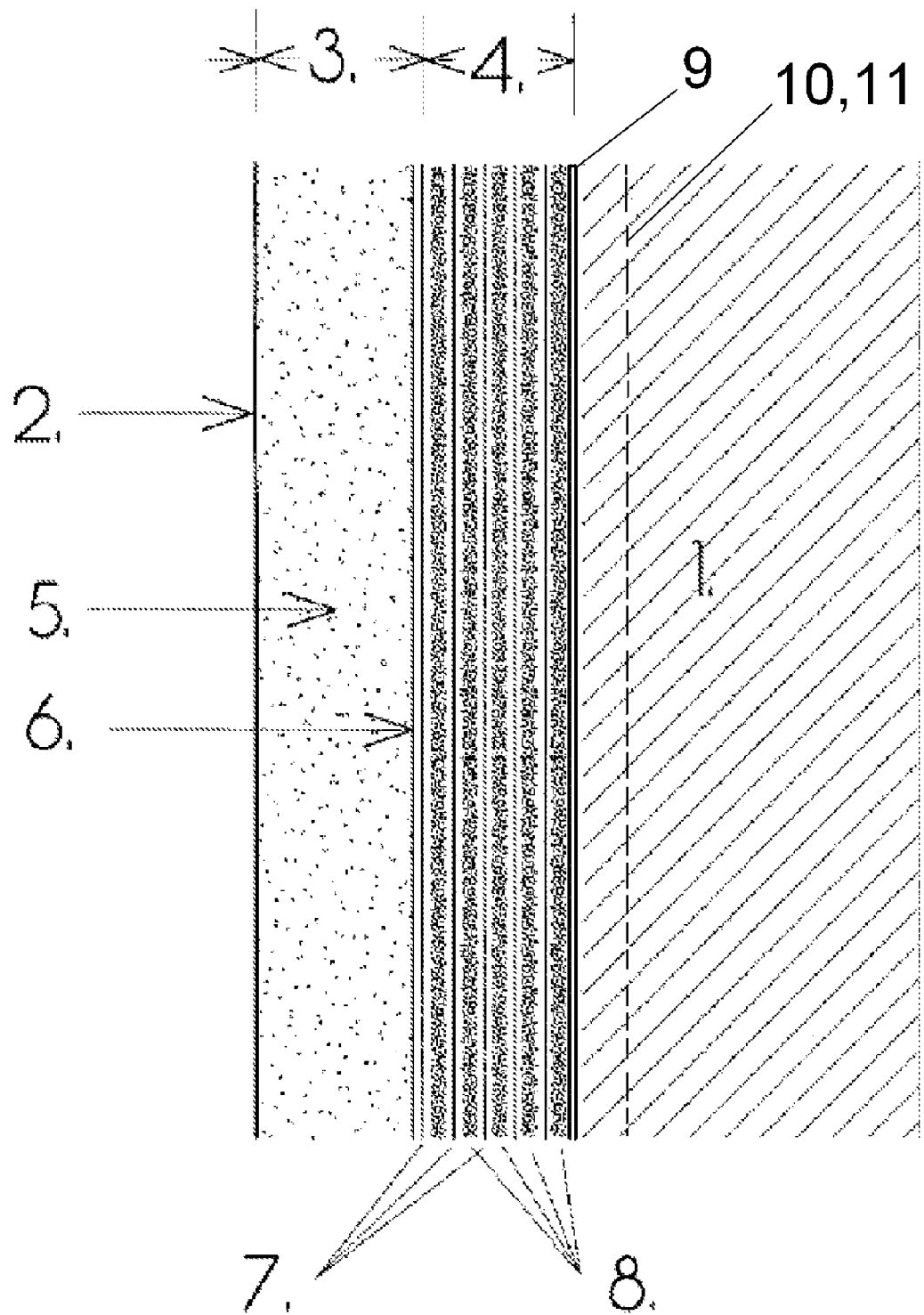

MULTI-LAYER BUILDING INSULATION AND WALLBOARD SHEET WITH MULTI-LAYER INSULATION

CROSS-REFERENCE TO RELATED APPLICATIONS

This patent application claims priority to U.S. Provisional Patent Application Ser. No. 61/159,776, filed Mar. 12, 2009. The aforementioned patent application is incorporated by reference herein in its entirety.

BACKGROUND

Most buildings enclose space which must be heated and cooled for occupancy. Depending on the location of the structure on Earth and the season, the building's envelope maintains a temperature differential between the inside and the outside. The ability of the envelope to reduce the flow of heat into or out of the volume is called its thermal resistance. The greater the thermal resistance a portion of the envelope has, the less energy is required to maintain that temperature differential. In the building industry, resistance to conductive thermal loss is measured in the unit "R" ("R-value"). It is the inverse of the unit of thermal conductivity, often represented by the unit "I" (or alternatively "U" or "U-value").

People are depleting natural resources at an ever-increasing rate. The scientific community is working on ways of harnessing power from "renewable" resources in nature (e.g., solar energy, wind energy, biofuels, tidal currents). Until methods are developed which fully utilize these sources, and implementation of such energy generation is wide-spread, most energy requirements must be satisfied via fossil fuel or nuclear technology.

In order to gradually reduce the use of fossil fuels for the conditioning of living space, various agencies promulgating construction requirements for new construction are continually increasing the insulation requirements ("R" values) for the building envelope. These requirements are approaching a point where typical framing materials, from which structures are usually constructed, will not be large enough in dimension to contain the increased thicknesses of insulation—typically inexpensive thermal insulation made of fiberglass blankets or loose-packed cellulose, for example. The next round of mandated insulation requirements may require the use of metal framing instead of wood, in order to provide thicker wall cavities and roof framing to accommodate thicker insulation. Construction professionals who are accustomed to designing and building wood structures would be greatly disadvantaged by such changes, and the economic impact of such changes on many tens of thousands of people will likely not be insubstantial.

Some alternative options for increasing the R-value of building envelopes may include use of varieties of foam insulating materials. However, such materials are substantially more expensive than fiberglass blankets or cellulose. Moreover, most, if not all foam insulation materials are made directly from petrochemicals, a depletable resource. Fiberglass is made from silicon, which is available in great abundance.

Further, the number of existing buildings in the world far outweighs the number of buildings that will be built in the near future The majority of such buildings were constructed prior to the development of more recent energy-conserving standards for building envelope performance. Indeed, most residential and other types of structures were constructed prior to any mandated thermal efficiency requirements whatsoever. Even structures that were built after the institution of thermal efficiency requirements were not built to today's efficiency standards. Effectively retrofitting existing buildings with traditional insulating materials is usually a costly endeavor.

Moreover, the absorption of moisture by fiberglass and cellulose insulation materials from interior or exterior sources has the effect of reducing the effective "R" values of the insulation, as compared with R-values of the same material when dry. That is, the addition of moisture can increase the thermal conductivity of an insulating material. If sufficiently severe, this phenomenon can even result in an R value that is less than air (i.e., a situation worse than no insulation at all). It is likely, therefore, that the insulation of structures currently insulated with fibrous insulation have not completely maintained their thermal efficiency.

There is, therefore, a need for construction materials and methods of construction and installation thereof, for improving the thermal resistance of existing structures as well as increasing the overall thermal resistance of new construction. The present disclosure addresses these needs.

SUMMARY OF THE DISCLOSURE

In accordance with one aspect of the disclosure, a multi-layer insulation material is provided. the insulation material includes a plurality of substantially air-impermeable material layers joined together, with at least one space being provided between a pair of adjacent material layers thereof. Any number of material layers can be provided, including but not limited in number to between 1 and 1000 layers of material.

At least one layer of a foam material can be interposed between a pair of adjacent material layers. At least one reflective layer can be provided for inhibiting radiative heat transfer across the insulation material.

In accordance with another aspect of the disclosure, construction panel is provided, having a structural panel portion having predetermined material properties for performing a predetermined function, and a plurality of substantially air-impermeable material layers joined to the structural panel portion, at least one space being provided between a pair of adjacent material layers thereof.

At least one layer of a foam material can be interposed between a pair of adjacent material layers. At least one reflective layer can be provided for inhibiting radiative heat transfer across the insulation material. The reflective layer can reflect into the insulation layer, if desired. By way of further example, one or more layers of insulating clay aerogel may additionally or alternatively be used.

The construction panel can be an insulating panel, such as a rigid foam insulating panel, for example. Alternatively, the construction panel can be a sheathing panel, such as a plywood sheet, waferboard sheet, gypsum sheathing board, cementitious sheet or other suitable material. Alternatively, the construction panel can be a wallboard panel, such as a gypsum wallboard material. Alternatively still, the construction panel can be a form panel for a poured wall structure. Such poured wall structure can include a concrete material.

BRIEF DESCRIPTION OF THE DRAWING

FIG. 1 illustrates an exemplary wall board material in accordance with the disclosure.

DETAILED DESCRIPTION

In accordance with the disclosure, a multi-layer building insulation material and a wallboard sheet with multi-layer insulation, and related manufacturing and installation methods are provided. In accordance with the disclosure, layers of membranes and air can be "sandwiched" together increase the thermal insulating value ("R" value) of a surface beyond that of a single layer of insulating material. In place of an air layer, a thin layer of foam plastic can be used as a separator between two adjacent layers or membranes. By way of further example, one or more layers of a clay aerogel can be used as an insulating layer. Such materials are known in the art and described, for example, in U.S. patent application Ser. No. 11/713,189, filed Mar. 2, 2007 and in U.S. patent application Ser. No. 12/012,248, filed Feb. 1, 2008. Each of the aforementioned patent applications is incorporated by reference herein in its entirety.

It is believed that an "R" value of about 1 can be achieved at each interface of air or foam and membrane. Therefore, for each layer of air or foam and membrane and the 2 air interfaces associated therewith would result in an "R" of approximately 2. By providing multiple thin material layers, it is believed that thermal resistance (the "R" value) can be achieved that far exceeds the "R" value of an insulation board with comparable thickness but having fewer layers.

Additionally, a layer of reflective foil or metallized layer can be provided in or on the sandwiched material. In one aspect, a foil layer can be attached to the face of the layered material on the face thereof that will face the conditioned space. Such material or equivalent thereto will provide for reflection of radiative heat energy. Alternatively, a metallized layer can be formed, such as by vapor deposition for example, on one or more of the substrates for this purpose.

The foregoing described insulation material can further be provided attached to a board material, such as paper or fiberglass-faced gypsum, resin-coated paperless wallboard, wood or composite paneling, sheathing materials including plywood and wafer board, cementitious board materials and the like. As a result, a wall board that can be effectively used and efficiently installed is provided.

Such wall boards can be laminated to existing interior wall surfaces of exterior walls, as well as to ceilings under unheated attics, or alternatively used on the exterior face of walls, if comprising a suitable material, such as plywood, for example. Use of such materials improves the insulating qualities of existing walls over and beyond any insulation that may reside within wall cavities. When applied to interior faces of walls and ceilings, the insulation, or insulation portion of the subject wall board, is completely inside the building and is therefore more protected from exposure to and penetration by moisture. Accordingly the thermal insulating value (R-value) should not deteriorate due to water (liquid or vapor) permeation. Moreover, plastic and plastic foam materials are more resistant to water penetration than glass or cellulose fiber materials.

On new construction, the subject materials can be used in place of conventional wall board and/or sheathing, and therefore can aid new construction in meeting or exceeding the required and future "R" value requirements. Although not required, with reference to the attached Figure the subject materials are preferably used with traditional insulating materials 11 within the wall cavity 10.

With reference to the attached Figure, attachment of the subject materials to underlying structures can be performed in any suitable manner—for example, through use of screws and/or adhesive. Sealant can be applied around mechanical fasteners, such as screws, and joints between adjacent wall boards can be sealed in any suitable manner, such as by use of a tape, which can be a multi-layer insulative tape 9 constructed in accordance with the disclosure. Such tape can be provided in strip form in rolls, with single or double adhesive faces, and applied to the underlying structure 1 or substrate prior to installation of the wall board or insulation material, for example.

Materials in accordance with the disclosure, as set forth above, preferably include multiple material layers, with air, aerogel, clay aerogel and/or foam layers therebetween. If desired, the core of an exemplary wallboard can be comprised principally of clay aerogel. Wallboard in accordance herein preferably has a core and an exterior layer, such of paper or other material that is mold and mildew resistant. The subject material layers can be free-floating, being held to a substrate with an over layer, for example, or can be fully or partially laminated to adjacent layers, such as by an adhesive, which may itself be may be of a material that is resistant to thermal conduction. Other techniques, such as a solvent or heat sealing can be utilized, if desired. However, such adhesion may prove to be useful only if used sparingly, so as to not degrade the heat conductive resistance of the material.

Adhesions between adjacent layers, if partial, can be provided in predetermined locations, such as, but not limited to an edge seal around the perimeter of the insulation sheet or wall board. Alternatively, adhesions can be provided a regularly spaced intervals, such as in a grid pattern.

In accordance with the disclosure, areas of layers that are not adhered to one another accordingly can be provided with a layer of a gas, however minute, which gas may be air, nitrogen, argon, or another gas that reduces thermal conductivity of the whole material. As set forth above, materials in accordance with the disclosure can alternatively be fully laminated with adhesive or with another suitable material or technique.

In accordance with the disclosure, FIG. 1 illustrates an example wall board material.

Element 1 represents the existing wall, or in the case of new construction, the wall or ceiling framing.

Element 2 represents the wallboard surface of the subject wall board material.

Element 3 illustrates the thickness of the wallboard. A preferred thickness for renovation wallboard is between ¼ inch and ⅜ inch.

Element 4 illustrates the thickness of the layered insulating portion. More or fewer material layers than the illustrated number illustrated can be used, for example any number between 1 and 50 layers, or more, can be used in accordance with the disclosure. A preferred thickness in accordance with the disclosure is about ¼ inch but can be greater to achieve a higher insulating value.

Element 5 represents the wallboard material, which as set forth above can be standard gypsum material, cementitious material, plywood, composite or the like.

Element 6 represents a reflective foil layer.

Elements 7 represent membrane layers which can be of a plastic material, such as polypropylene sheeting or other material, and can include at least a portion of recycled material.

Elements 8 represent foam plastic and/or aerogel interlayers, which can be used alone or in conjunction with air interlayers. The foam material is preferably selected for maximum performance in this application and can be sprayed or roller applied to one side of a membrane and the sandwich then rolled to a uniform thickness at a stage in the curing of the foam. Such foam may advantageously include a large percentage of voids, to minimize the thermal conductivity of the material.

Although the subject devices and methods have been described with respect to preferred embodiments, those skilled in the art will readily appreciate that changes and modifications may be made thereto without departing from the spirit and scope of the subject disclosure. Further, it is to be understood that specific aspects of the disclosure described in connection with one embodiment, can additionally be applied to any other embodiment set forth herein.

What is claimed is:

1. A multilayer wall panel comprising:
   a) a wallboard having a first major surface and a second major surface;
   b) a mold and mildew resistant layer attached to the first major surface;
   c) a plurality of substantially air-impermeable material layers joined together defining a space between each material layer, wherein one of the material layers is at least partially laminated to the second major surface of the wallboard;
   d) at least one layer of insulating material interposed between two respective layers of the substantially air-impermeable material layers; and
   e) at least one reflective layer for inhibiting radiative heat transfer.

2. The multilayer wall panel of claim 1, wherein the mold and mildew resistant layer includes paper.

3. The multilayer wall panel of claim 1, wherein the wallboard is selected from the group consisting of resin-coated paperless wallboard, a composite panel, plywood, waferboard, and a cementitious board.

4. The multilayer wall panel of claim 1, wherein multilayer wall panel is at least partially fiberglass-faced.

5. The multilayer wall panel of claim 1, wherein clay aerogel material is present between the first major surface and second major surface.

6. The multilayer wall panel of claim 1, wherein the wallboard includes a core layer that is comprised principally of clay aerogel material.

7. The multilayer wall panel of claim 1, wherein the insulating material interposed between two respective layers of the substantially air-impermeable material layers includes air.

8. The multilayer wall panel of claim 1, wherein the insulating material interposed between two respective layers of the substantially air-impermeable material layers includes foam.

9. The multilayer wall panel of claim 1, wherein the insulating material interposed between two respective layers of the substantially air-impermeable material layers includes aerogel.

10. The multilayer wall panel of claim 1, wherein the insulating material interposed between two respective layers of the substantially air-impermeable material layers includes clay aerogel.

11. The multilayer wall panel of claim 1, wherein the material layer that is laminated to the second major surface of the wallboard is partially laminated to the second major surface of the wallboard.

12. The multilayer wall panel of claim 1, wherein two adjacent layers of the wall panel are laminated to each other using an adhesive that is resistant to thermal conduction.

13. The multilayer wall panel of claim 1, wherein the reflective layer is positioned between adjacent layers of the multilayer wall panel.

14. The multilayer wall panel of claim 1, wherein the reflective layer is a metallized layer.

15. The multilayer wall panel of claim 1, wherein the reflective layer includes foil.

16. A building structure including a plurality of adjacent multilayer wall panels attached to the building structure, at least one of the multilayer wall panels comprising:
   a) a wallboard having a first major surface and a second major surface;
   b) a mold and mildew resistant layer attached to the first major surface;
   c) a plurality of substantially air-impermeable material layers joined together defining a space between each material layer, wherein one of the material layers is at least partially laminated to the second major surface of the wallboard;
   d) wherein at least one layer of foam material is interposed between two respective layers of the substantially air-impermeable material layers; and
   e) at least one reflective layer for inhibiting radiative heat transfer.

17. The building structure of claim 16, further comprising a multi-layer insulative tape having a pair of opposing external faces applied to a joint defined by the adjacent multilayer wall panels.

18. The building structure of claim 17, wherein the multilayer insulative tape further includes a plurality of layers of insulated material adhered to each other.

19. The building structure of claim 18, wherein the multilayer insulative tape further includes opposing adhesive external faces on each face of the tape.

20. The building structure claim 16, further comprising plywood attached to an exterior face of the building structure, the plywood including a plurality of insulating layers attached to an interior facing face of the plywood.

* * * * *